United States Patent Office 3,450,838

Patented June 17, 1969

3,450,838

DEVICE MODIFYING PITCH FREQUENCY AND/OR ARTICULATION SPEED FOR NATURAL SPEECH

Kurt Bandat and Ernst Rothauser, Vienna, Austria, assignors to International Business Machines Corporation, Armonk, N.Y., a corporation of New York Filed Apr. 1, 1965, Ser. No. 444,686

Claims priority, application Austria, Oct. 16, 1964, A 8,823/64

Int. Cl. H04m *1/00*

U.S. Cl. 179—1 3 Claims

ABSTRACT OF THE DISCLOSURE

An apparatus for modifying the pitch frequency, the tone and the articulation speed of natural speech. The speech signal is operated on by two channels. The first of these being the speech channel in which an encoding unit separates the incoming speech into a group of frequency bands, an A to D converter for digitizing the signals in each of the frequency bands, a chain of digital storage units each having two inputs, adders for adding the values occurring at the two inputs of the digital storing units, and multiplying circuits for varying the number of pulses transmitted to thereby achieve variation in the speech frequency, tone, and articulation speed. The second channel is an analyzing device for performing arithmetic and logical operations on the speech signal to control the variation in pitch frequency, tone and articulation speed in the speech channel.

Figure 1:
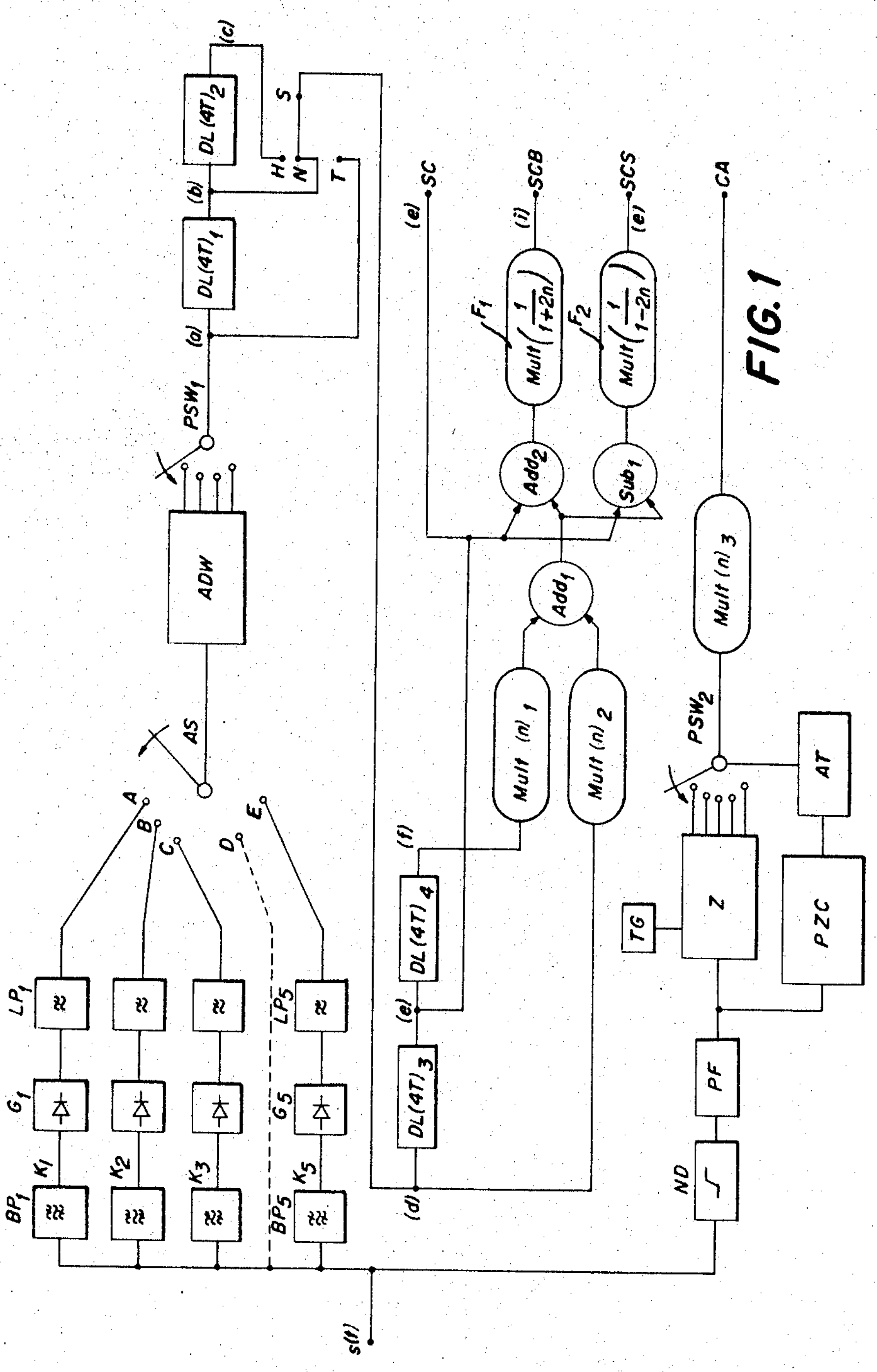

This invention relates to an arrangement for modifying the pitch frequency and the articulation speed of natural speech. It is based on the principle of the channel vocoder with pulse excitation according to which two functions, a spectrum function and an excitation function, are derived from the input speech signal, as is well known.

In order to vary the pitch frequency and/or the tone of the speech, it is necessary, on the one hand, to vary the fundamental frequency of the excitation including its harmonics in frequency while on the other hand, it is also desirable to shift the spectrum values with respect to the positions of their minimums and maximums and to influence the mutual relationships of such minimums and maximums.

Accordingly, the present invention has for its object to provide an arrangement by means of which it is possible to vary the pitch frequency, the tone and the articulation speed of the speech.

Thus, an arrangement for modifying the pitch frequency and the articulation speed of natural speech is provided which consists of an encoding unit for speech based on the channel vocoder principle where sets of band-pass filters, rectifiers and low-pass filters analyze the energy of the speech signal in individual frequency bands. These channel values are interrogated and converted into digital information in an analog-to-digital converter. The arrangement further comprises an analyzing channel for the approximately pulse-like excitation of the speech channel, which at the time of the excitation delivers pulses serving to read a digital counter advancing at a fixed frequency, to reset it to zero and to cause it to resume its counting operation starting from zero. The arrangement further initiates the transmission of the count as read into a digital storage unit which after each acception of the count also receives the digital values of the channel energy and, after a freely selectable period at the times stored by the counts, which correspond to the times of the analyzed excitation pulses, delivers them again and applies them to a regeneration circuit which then approximately restores the original speech signal. With respect to this arrangement, the invention consists in the provision that following the analog-to-digital converter a chain of digital storage units is inserted each having two inputs and adding the values occurring at the two inputs, one of said inputs being connected to the respectively preceding stage and the second input, adjustable by switches, either receiving no signal or receiving the signal from the preceding stage multiplied by a factor smaller than one or the signal of the next following stage multiplied by a factor greater or smaller than one, whereby after a scan of all channel values the numerical modification of these values causes a displacement of the spectrum represented by the values in the direction to the higher or the lower frequencies. Inserted in the excitation channel following the counter in the transmission line to the storage unit is a multiplier which freely selectably modifies the value of the count to be stored numerically and thus varies the spacing of the excitation pulses and consequently the fundamental frequency of the regenerated speech signal.

Finally, the multiplier is followed by a suppressor which selectively either fails to transmit every *n*-th of the incoming counts or transmits every *n*-th count twice, *n* being freely selectable, so that the regenerated speech signal is either reducible or extendable in its over-all duration.

The arrangement of the present invention may be further refined in a very advantageous manner by the provision that in the spectrum channel the analog-to-digital converter is followed by a parallel-to-serial converter the output of which is connected to a delay chain, the delay chain in turn being composed of a number of individual delay lines with interconnected taps. Also provided is a switch having three contacts connected to the input, the first and the second taps of said delay chain. The output of the switch is connected to the third tap which in turn is connected to a multiplication circuit. The fourth tap is connected both to the first input of an adding circuit and to the first input of a subtracting circuit, the respectively remaining input of the adding and of the subtracting circuit being connected to the output of another adding circuit one input of which is connected to the output of the above mentioned multiplication circuit and the other input of which is connected to the output of another multiplication circuit. The input of this last mentioned multiplication circuit is connected to the output of the delay chain. Furthermore, the output of the first mentioned adding circuit is connected to the input of a first correction stage, and the output of the subtracting circuit is commoned with the input of a second correction stage. Through the outputs of the correction stages, the varied spectrum code is then made available. For adapting the spacing of the excitation pulses to the varied spectrum code, the excitation channel includes a circuit for changing the number of excitation pulses. The said circuit changes the scanning sequence of the parallel-to-serial converter scanning the count of the counter, the converter output signals being applied to a suitable multiplication circuit. The change in the number of the excitation pulses is effected in such a manner that for an adaptation to a displacement of the spectrum toward higher frequencies some counts are transmitted twice and for a displacement toward lower frequencies some counts are not transmitted. Since each transmitted count represents an interval of time, it is necessary for maintaining the original articulation speed that the multiplication circuit multiply each count by a factor smaller than one for displacements toward higher frequencies and multiply each count by a factor greater than one for displacements toward lower frequencies. The adapted signals of the excitation code will then appear at the output of this multiplication circuit.

The variation of the articulation speed is effected very advantageously in an arrangement related to the excitation channel, where the pulse shaper is followed by a delay circuit the output of which is connected to the zero-reset input of the counter. Also provided is a rotary switch control connected to the pulse shaper and advancing the rotary switches one step for each pulse. Furthermore the rotary switches are also connected to the pulse shaper through their contact bank. In the connection of one switch, one of the contacts is interrupted and in the other switch an additional contact is provided which is connected through an OR circuit to the output of the pulse shaper. The remaining input of the OR circuit is connected to an additional delay circuit the input of which is also connected to the pulse shaper. Moreover, an additional switch is provided the first contact of which is connected to the output of one switch, the second contact of which is, however, connected to the contact bank and the third contact of which is connected to the output of the other switch, the output of said additional switch being conneced to a scanning control for controlling a parallel-to-serial converter following the counter. The output of said converter finally is connected to the puffer storage unit. Also provided is a clock generator having a variable clock frequency for controlling the abovementioned counter.

This clock generator having a variable clock frequency represents another modification of how to achieve the effect of the multiplication circuit in the output of the excitation channel.

A variation of the pitch of the excitation is effected by a change in the clock frequency which causes a multiplication of the counts by a corresponding factor, in which process it is, however, necessary to insert or to eliminate excitation pulses for obtaining a constant articulation speed.

The invention is usable with favorable results wherever it is desired e.g. to have electronic data processing systems deliver data in spoken form, such as information on market rates or seat reservations, and wherever data on speech, e.g. the values of the momentary energy in the individual spectrum channels or information about the excitation function, are stored in a digital form, for example as pulse code groups or as groups of pulse-amplitude modulated signals. By such variation, especially however in the pitch frequency and in the articulation speed, it may be insured, on the one hand, that the transmission of the spoken output data (change in the frequency of the pitch) may be better adapted to a transmission channel and, on the other hand, that (change in the articulation speed) the output rate of the spoken data is influenced.

Figure 2:
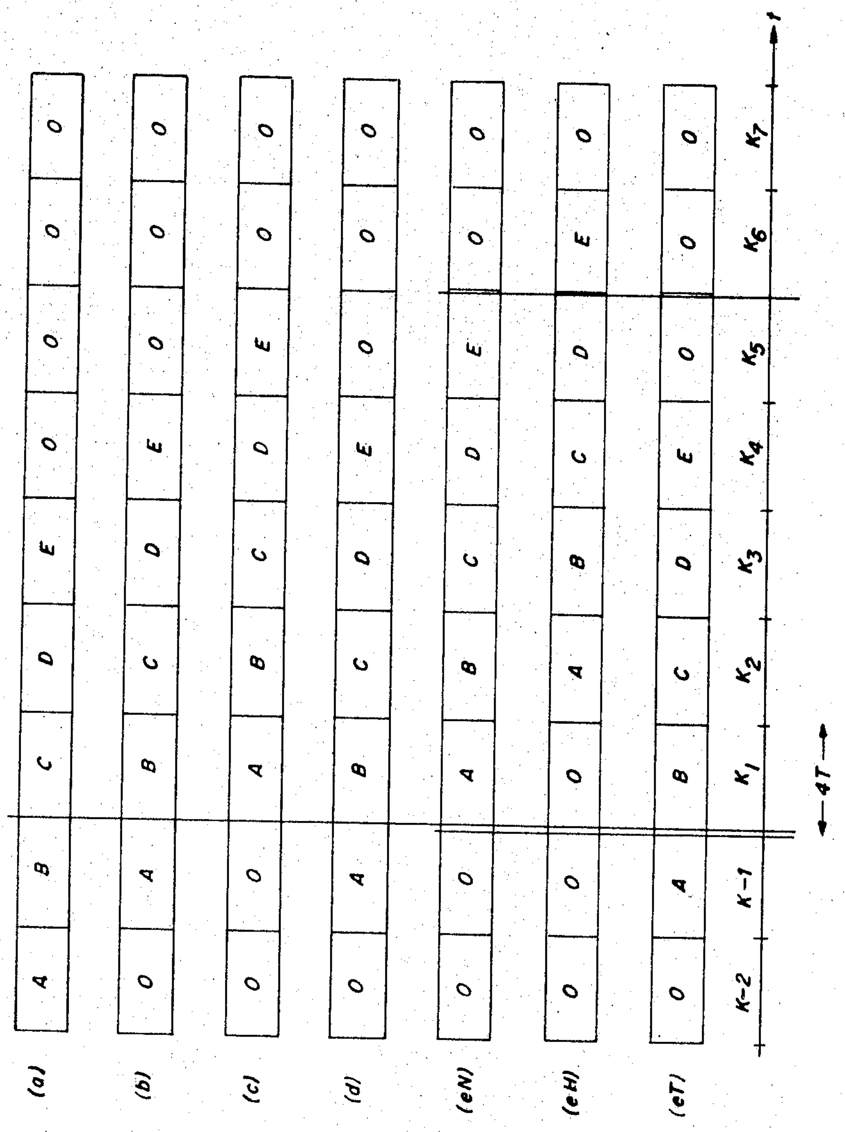
Figure 3:
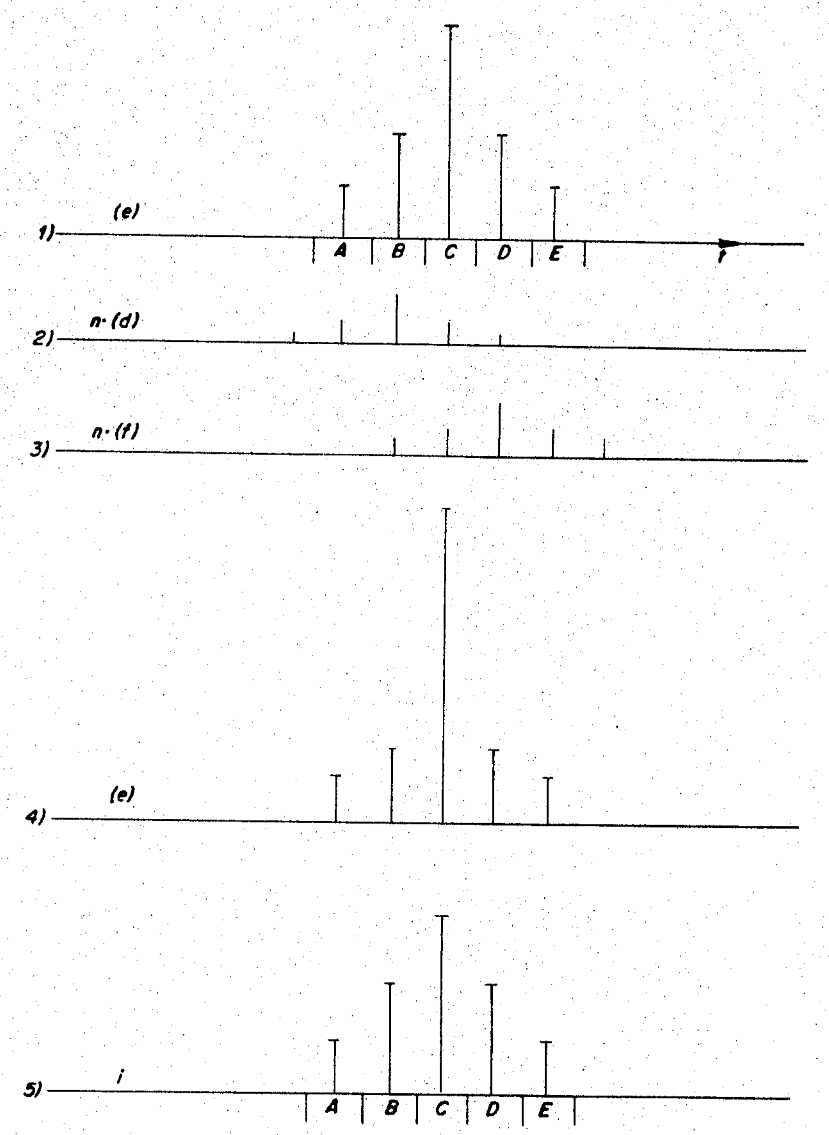
Figure 4:
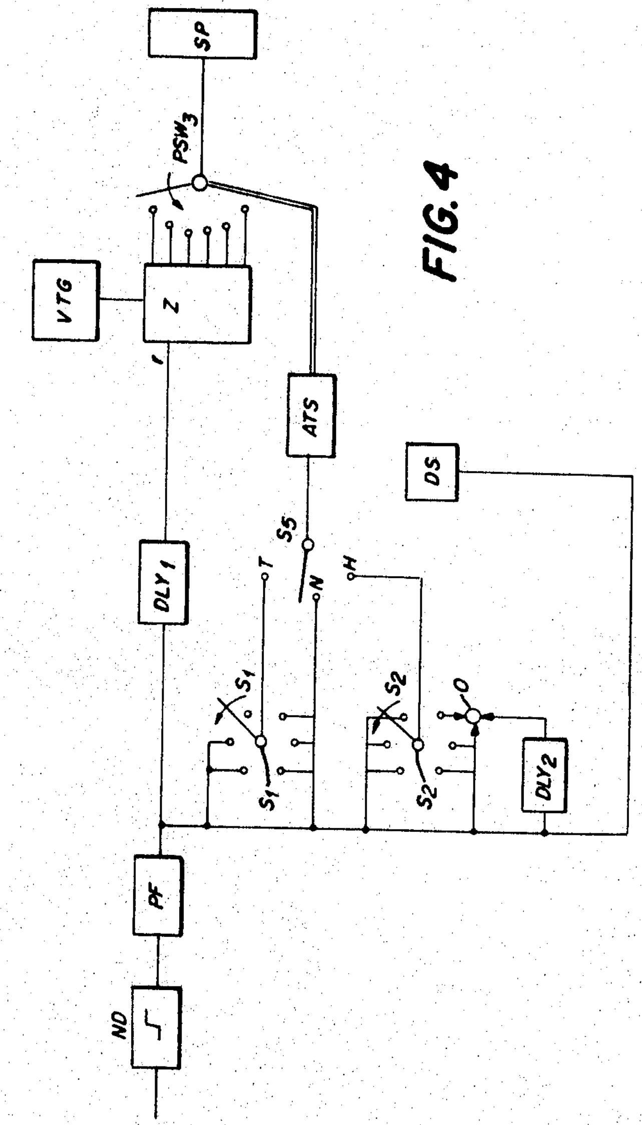
Figure 5:
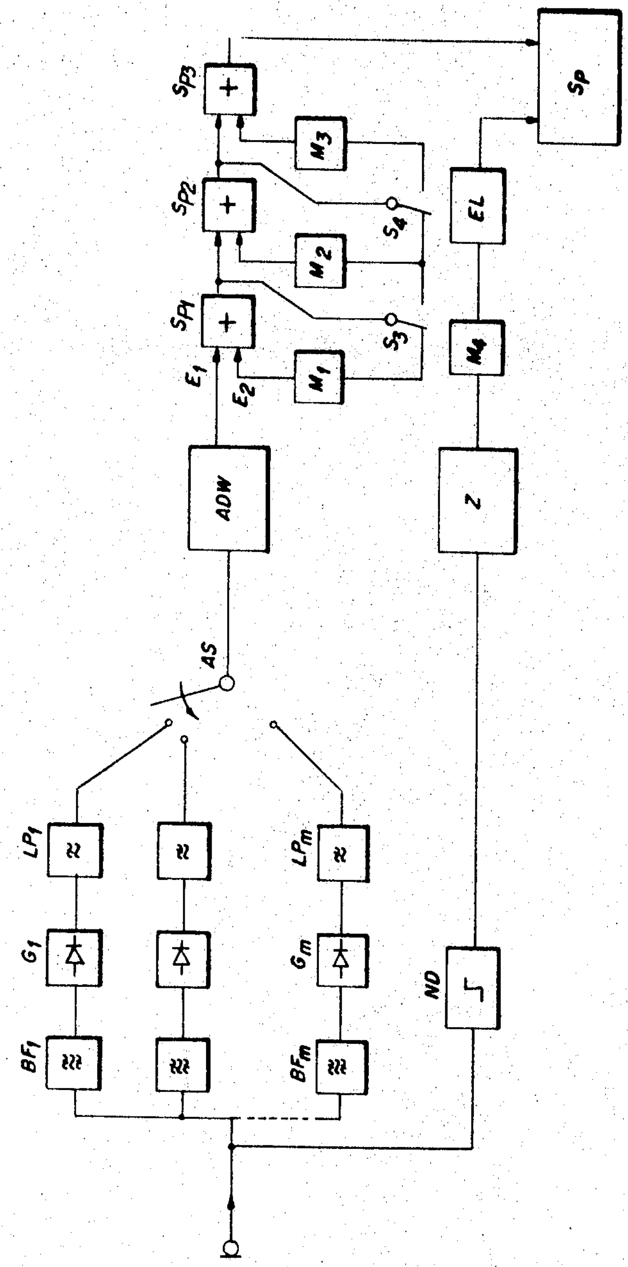

The present invention will be described in detail below in conjunction with an embodiment thereof as illustrated in the drawings, wherein:

FIG. 1 shows the block circuit diagram of an arrangement for varying the pitch frequency and the articulation speed of natural speech, FIG. 2 is a showing of the displacement of the values in the individual channels, FIG. 3 is an analog representation of the channel values at different points in the arrangement, FIG. 4 shows the block circuit diagram of the extended excitation channel, and FIG. 5 shows the block circuit diagram of the basic arrangement for modifying the pitch frequency and the articulation speed.

The arrangement shown in FIGURES 1 and 5 functions to analyze the spectrum of the speech signal in a known manner by means of band-pass filters tuned to the individual frequency bands, $BP_1$ to $BP_5$, which preferably are designed logarithmically, so that each band-pass filter will pass an equal interval in the spectrum range, as well as by means of rectifiers $G_1$ to $G_5$ following each channel and by low-pass filters $LP_1$ and $LP_5$ for detecting the momentary value of the energies in the individual frequency bands, the so-called channel values. These channel values are, as shown in FIG. 1, scanned by a switch AS, and in analog-to-digital converter ADW the analog values of the channel values are converted into digital values, preferably in a binary parallel representation. The values available in parallel at the output of the converter ADW are then converted into serial values by another scanner $PSW_1$.

Since the individual channel values of this serial representation do not include an identification of the channel from which they have been derived, an association of a channel value with its frequency band is possible only by considering the occurrence of these values in time. In the example illustrated in FIG. 2, the five channels $K_1$ to $K_5$ are scanned successively and the values A to E are derived. The value occurring at point (*e*) in the time interval $k_1$ is then interpreted by the subsequent components as the value of the frequency band $K_1$. In the illustrated arrangement it is assumed that a channel value is represented by a four-bit code group and that it is delayed by four bit times by a delay element $DL(4T)_1$. For the output (*d*) and (*e*N) to (*e*T), respectively (in FIG. 2), the illustrated arrangement of two delay elements $DL(4T)_1$ and $DL(4T)_2$ with the switch S permits a displacement of the channel values by one channel to the left or to the right, i.e. toward lower or higher frequencies. If a displacement by several channels were desired, a plurality of delay elements $DL(4T)_1$ would have to be provided in an analogous manner. The arrangement shown to follow the switch S permits a channel value to be influenced in accordance with its adjacent values. The adjacent channel values derived at points (*d*) and (*f*) and multiplied by a factor $n<1$ in the circuits Mult $(n)_1$, Mult $(n)_2$ are either added to the channel value itself in the circuits $Add_1$ and $Add_2$ or subtracted from the channel value in the circuit $Sub_1$. The resulting value, i.e. the sum or difference, is also multiplied by a corrective factor $F_1$ or $F_2$ which, with a constant spectrum, insures that the channel values, except for the two marginal values, remain unchanged. The action of this arrangement may be understood more readily by referring to FIG. 3. For improving the clarity of illustration, the channel values are here represented by analog values. The diagram (1) shows the original channel values A, B, C, D and E, while (2) and (3) show the values multiplied by the factor *n* (here .25) in their position in time at points (*d*) and (*f*), and (4) and (5) show the result of the addition or subtraction with the subsequent amount correction. It may be seen how in (4) a relative increase or in (5) a relative decrease of the peak values is achieved with the spectrum area remaining approximately equal. The multiplication of the channel values is an easily realizable process. For the chosen binary channel-value representation and the factor $n=.25$, it involves merely a binary shift of the values by 2T with the subsequent insertion of binary zeros for Mult $(n)_{1,2}$. Analogously, by delay and addition the factors $F_1$ and $F_2$ $$\left(\text{Mult}\left(\frac{1}{1+2n}\right)\text{ and Mult}\left(\frac{1}{1-2n}\right)\right)$$

are exactly representable or approximable, depending on the selection of the values for *n*.

The second function derived from the speech signal is the excitation function which is derived in a well-known manner from the zero crossings of the fundamental wave of speech in the circuit ND and consists of pulses suitably shaped in the circuit PF, the repetition rate of which is equal to the fundamental frequency of the speech. A counter Z, which is advanced by a fixed clock generator TG, converts the spacings of successive pulses into binary numbers that are converted into a serial representation in a parallel-to-serial converter $PSW_2$. Up to this point, the arrangement of the excitation channel corresponds to the known prior art. If it is now desired that a resulting excitation serve to produce a speech signal having a longer or shorter articulation time without affecting the pitch frequency, it is necessary to produce additional excitation values or to eliminate derived values. If it is desired to change the pitch, the measuring values of the excitation pulses must be modified. That is possible, on the one hand, by numerical multiplication in a multiplier Mult$(n)_3$ in FIG. 1 or $M_4$ in FIG. 5 or, on the other hand, by varying the frequency of the clock generator TG (VTG in FIG. 4). The change in the articulation speed resulting in both cases (the analogon would be a magnetic tape running at a higher or lower speed) must be compensated by inserting or eliminating excitation pulses.

FIG. 4 illustrates an arrangement for effecting such a change in the articulation speed. The pulse series supplied by the pulse shaper PF is reduced by one pulse by means of the rotary switch $S_1$ on each cycle of the latter, e.g. by separating one contact from the contact bank, and increased by one pulse by the rotary switch S2 by doubling a pulse, e.g. by means of the delay in the circuit $DLY_2$ or by the OR circuit O. The switches themselves are advanced one step by each pulse in the series. Each pulse reaching the scanning control ATS initiates a single scan of the, preferably binary, value in the counter Z. The pulse of the series which is being considered, which is delayed in $DLY_1$, thereafter resets the counter to zero through its input *r*, whereafter a new count will start. The numerical modification of the counts is effected by changing the clock generator VTG controlling the counter. The binary value of the counter Z present in parallel representation is converted into a serial representation by the switch $PSW_3$ and transmitted to the storage unit S*p*.

The above described arrangement for analyzing and modifying the spectrum and excitation functions supplies at its outputs (*e*), (*i*), (*l*) and CA digital signals for the spectrum code and the excitation code representing the modified speech signal. If the modification does not involve a change in the articulation speed, speech may be generated directly from the code. If, however, the articulation speed is modified, a digital storage unit SP (FIG. 4 and FIG. 5) must be used which is capable of buffering the difference resulting from the differential time scales in the data flow of the code generation and the speech-signal regeneration.

We claim:

1. Speech apparatus comprising:

encoding means for encoding an audio signal into a plurality of analog frequency band signals, converter means connected to said encoding means for converting said analog frequency band signals into digital values for logical and arithmetic processing, digital storage means connected to said converter means for storing said digital values, wherein said digital storage means comprises a plurality of digital cascaded storage units each of which has a pair of inputs, the first of said inputs being connected to the respectively preceding stage while the second of said inputs is connected to the output of a switching means the inputs of said switching means being connected to the outputs of a plurality of multiplying circuits, frequency varying means to vary the fundamental frequency of a generated speech signal, and control means for varying the articulation speed of said generated speech signal, both of said means controlling said multiplying circuits, whereby after a scan of all of said frequency band signals, the numerical modification of said digital representation causes the pitch frequency, the tone, and the articulation speed of a speech signal to be varied.

2. Apparatus according to claim 1 wherein said converter means is followed by a parallel-to-serial converter, the output of which is connected to a delay chain comprising a number of individual delay lines with interconnected taps, the input and the first and second taps of said delay chain being connected to the contacts of a selector switch, the output of which is connected to the third tap which in turn is connected to a first multiplying circuit, the fourth tap of said delay chain being connected both to the first input of a first adding circuit and to the first input of a subtracting circuit and the respective other input of said adding and said subtracting circuits being connected to the output of a second adding circuit, one input of which is connected to the output of said first multiplying circuit and the other input of which is connected to the output of a second multiplying circuit the input of which is connected to the output of said delay chain, the output of said first adding circuit is connected to the input of a first correction stage and the output of said subtracting circuit is connected to the input of a second correction stage, the outputs of said correcting stages supplying a plurality of varied spectrum codes, that moreover for adapting the spacing of a plurality of excitation pulses to one of said plurality of varied spectrum codes, an excitation channel is included which comprises a circuit for changing the number of said plurality of excitation pulses which modifies a plurality of scanning pulses of said parallel-to-serial converter scanning the output of a counter, the output signals of said converter being applied to a suitable multiplying circuit the output of which makes available an adapted excitation code.

3. Apparatus according to claim 2 for varying the articulation speed of a speech channel, wherein in an excitation channel a pulse shaper is followed by a delay circuit, the output of which is connected to a zeroing input of a counter, and wherein a rotary switch control is provided which is connected to said pulse shaper and which on each pulse advances a plurality of rotary switches one step, and wherein each of said rotary switches has a first contact connected to a contact bank which is also connected to said pulse shaper in such a manner that one of the contacts of a first rotary switch of said plurality is disconnected from said contact bank, and in another of said rotary switches of said plurality a second contact has its connection to said contact bank interrupted and in said other switch an additional contact is provided connected to the output of an OR circuit, one input of which is connected to said contact bank and the other input is connected to the output of a second delay circuit having its input also connected to said contact bank and wherein a third switch is provided, the first contact of which is connected to said contact bank, the second contact of which is connected to the output of said first rotary switch and the third contact of which is connected to the output of said another rotary switch, the output of said third switch being connected to a scanning control for controlling a parallel-to-serial converter following said counter, the output of said counter is connected to the input of a buffer storage unit and wherein said counter has an input connected to a variable frequency clock generator.

References Cited

UNITED STATES PATENTS

| | | | |
|---|---|---|---|
| 3,052,757 | 9/1962 | Kalfaian | 179—1 |
| 3,238,301 | 4/1966 | Dreyfus | 179—1 |

KATHLEEN H. CLAFFY, *Primary Examiner.*

ROBERT P. TAYLOR, *Assistant Examiner.*

U.S. Cl. X.R.

340—347

PO-1050
(5/69)

UNITED STATES PATENT OFFICE
CERTIFICATE OF CORRECTION

Patent No. 3,450,838 Dated June 17, 1969

Inventor(s) Kurt Bandat and Ernst Rothauser

It is certified that error appears in the above-identified patent and that said Letters Patent are hereby corrected as shown below:

Column 6, lines 44 and 45, delete "has its connection to said contact bank interrupted and in said other switch an additional contact"

SIGNED AND
SEALED
JAN 19 1971

(SEAL)
Attest:

Edward M. Fletcher, Jr.
Attesting Officer

WILLIAM E. SCHUYLER, JR.
Commissioner of Patents